Aug. 16, 1938.   J. A. JENSEN   2,127,225
VALVE OPERATING MECHANISM FOR TANK VEHICLES
Filed Aug. 31, 1935   3 Sheets-Sheet 1
FIG. I
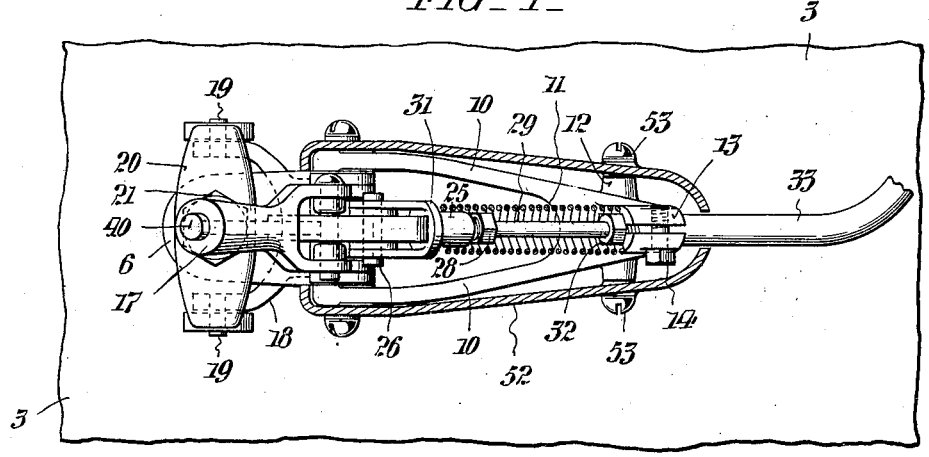
FIG. II
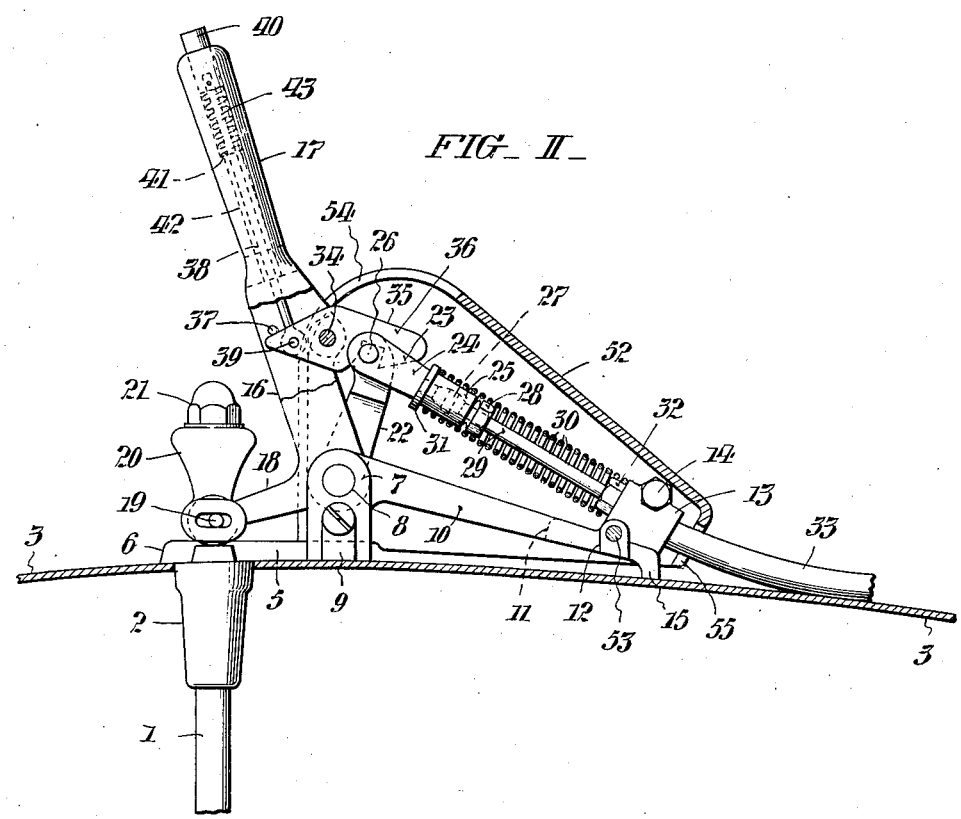
WITNESSES:
INVENTOR:
James A. Jensen,
BY
ATTORNEYS.

Aug. 16, 1938.  J. A. JENSEN  2,127,225
VALVE OPERATING MECHANISM FOR TANK VEHICLES
Filed Aug. 31, 1935     3 Sheets-Sheet 2
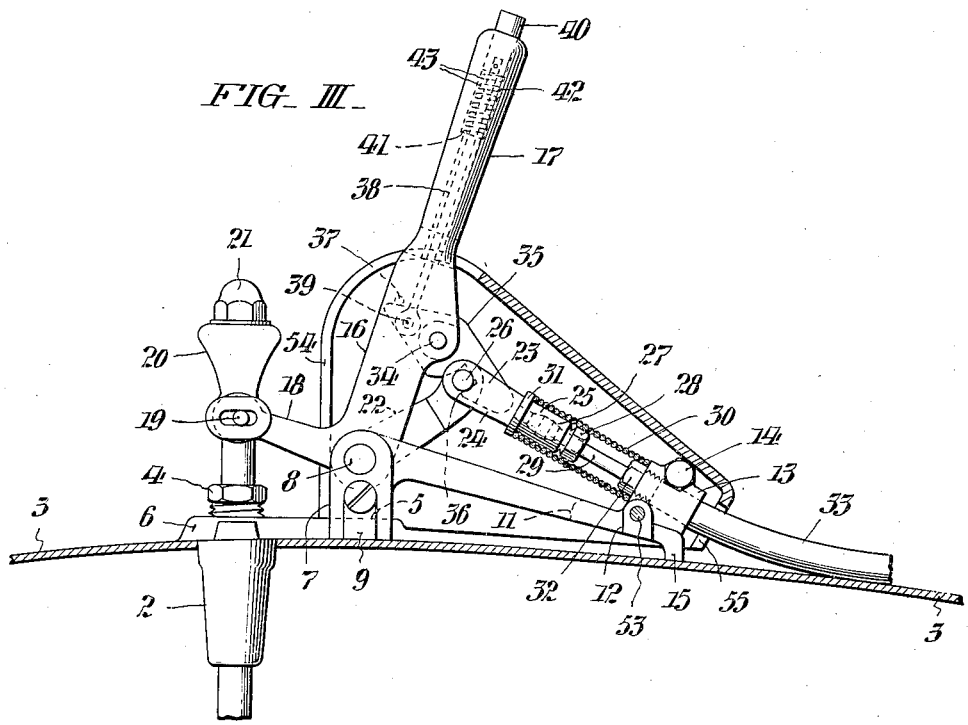
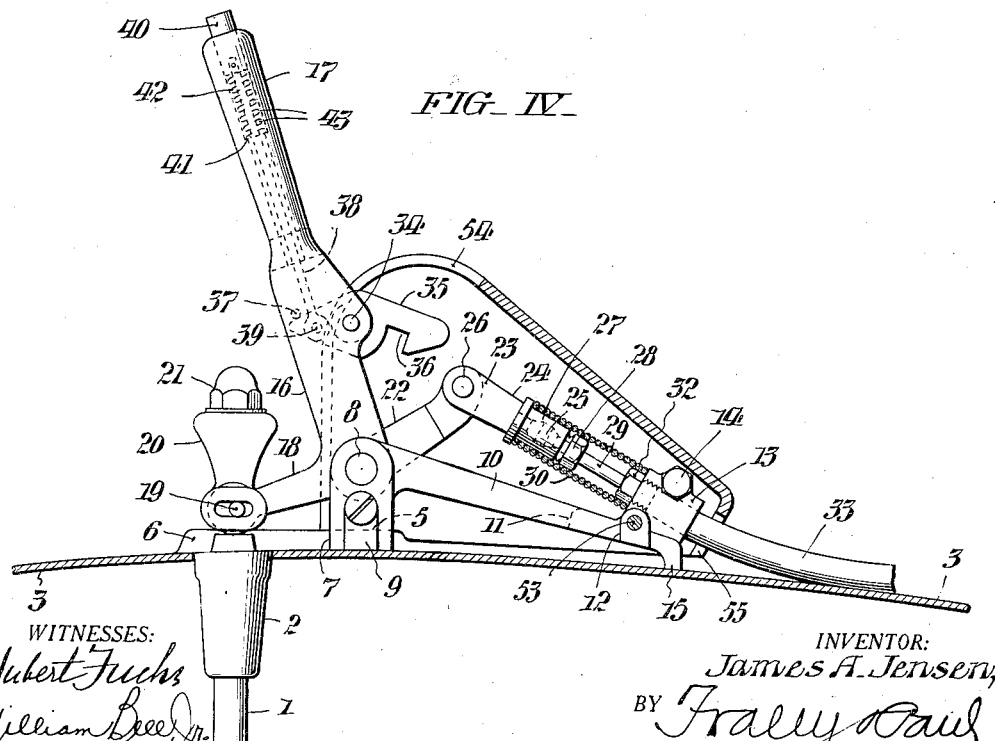
WITNESSES:
Hubert Fuchs
William Beel Jr.
INVENTOR:
James A. Jensen,
BY Frailey Paul
ATTORNEYS.

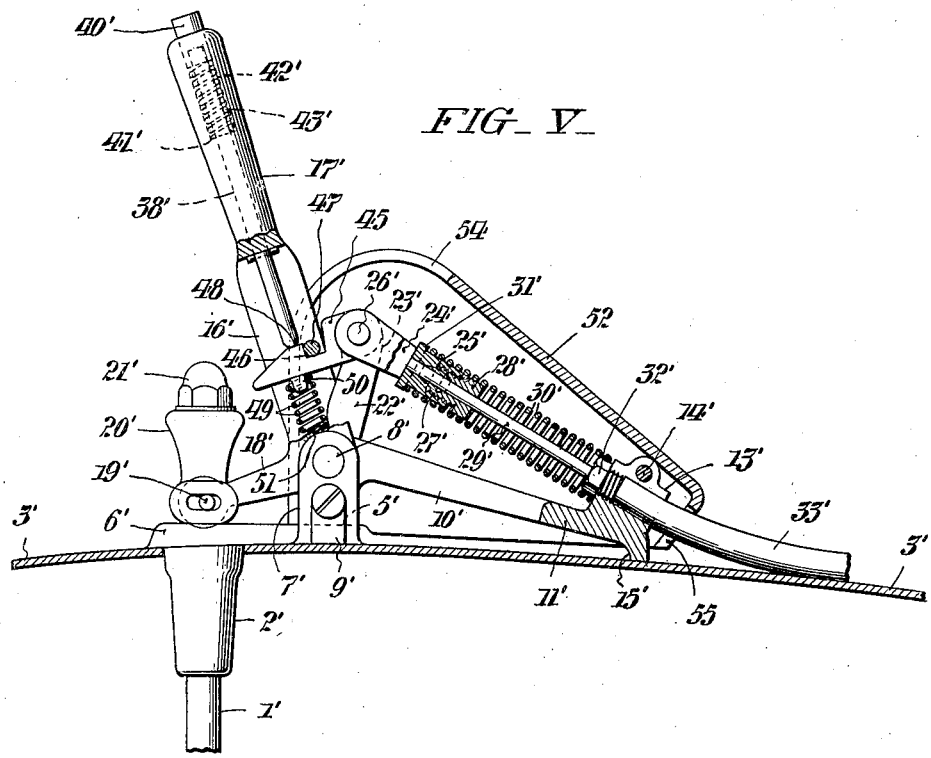
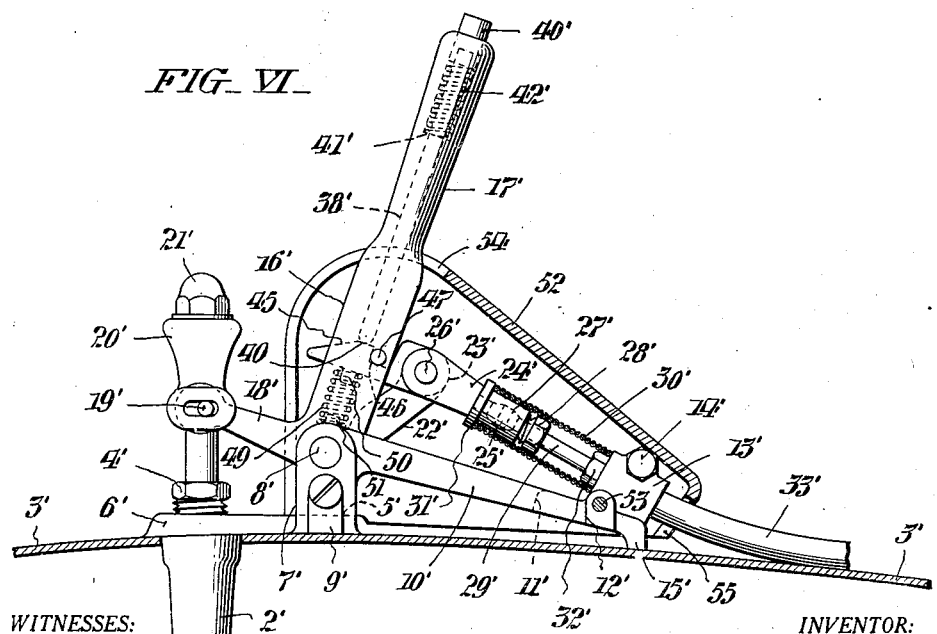

Patented Aug. 16, 1938

2,127,225

UNITED STATES PATENT OFFICE 2,127,225

VALVE OPERATING MECHANISM FOR TANK VEHICLES

James A. Jensen, Philadelphia, Pa., assignor to Quaker City Iron Works, Philadelphia, Pa., a corporation of Pennsylvania Application August 31, 1935, Serial No. 38,729

18 Claims. (Cl. 137—139)

This invention relates to valve operating mechanism for tank vehicles of the type now commonly known as multi-compartment tanks, such as are employed in the transportation and delivery of gasoline oils and other liquids; such vehicles usually being provided with valves individual to each compartment and communicating into a common conduit, for discharge or filling purposes, and capable of individual or collective operation as required.

More particularly the present improvements have reference to valve control mechanisms wherein the valves are capable of actuation from a distant point individually or collectively, or adapted for individual actuation at points local to the respective tank compartments; such as is featured in a companion application for patent filed concurrently herewith under Serial No. 38,-728, and which issued as Patent No. 2,096,374, dated October 19, 1937.

In the mechanism above referred to, the flexible coordinating cable intervening the distant and local mechanisms is operatively coupled to the local mechanism by a rotatable member included in the latter and a composite split-wedge and jamb-means attaching the adjoining cable end thereto.

The primary object of the instant improvements is to furnish a novel trip connector means for the local actuating mechanism, in lieu of the coupler attachment featured in the companion application above referred to, which when released, as each compartment of the tank vehicle is filled to the requisite level to effect closure of the associated valve, is automatically recoupled to the distant valve controlling means when the latter is or are, individually or collectively, returned to closed position incident to completion of the tank filling operation.

Other objects of this invention are to generally simplify and improve the construction of valve controlling mechanism of the type referred to, as well as make it more positive in action, less liable to get out of order, in addition to being fool-proof and well adapted for the purpose had in view.

With the foregoing objects in view, this invention consists in the novel features of construction, combination and arrangement of parts, as will be hereinafter more fully disclosed, illustrated by the accompanying drawings, and specifically defined in the claims at the end of this specification.

In the drawings:

Fig. I is a top plan view of one practical embodiment of the improved connector mechanism with the local actuating means operatively coupled to the cable coordinating said means with the distant actuating mechanism, and the valve lifting member in normal position.

Fig. II is an elevation of the same, with parts in section for illustrative clarity.

Fig. III is a similar elevation showing the mechanism in the position occupied incident to actuation by the distant control.

Fig. IV is a corresponding illustration, showing the position of the parts when a valve has been closed by release of the local actuating mechanism.

Figs. V and VI are views similar to Figs. II and III, of a modified form of the invention.

In all the views corresponding parts are designated by similar reference numerals, except where structural differences exist.

As in the application hereinbefore referred to, each compartment valve, not shown, is provided with a lift-member 1 extending upwardly through a stuffing-box 2 seated in the shell 3 at the top of the associated tank compartment. This stuffing-box 2 is fitted with a packing gland 4, accommodating axial movement for the rod 1, and preferably forms an integral part of a bracket or frame, comprehensively designated 5. The bracket or frame 5, as will be best seen in Figs. I and II, embodies a base 6 including the stuffing box 2, and spaced bearings 7 affording stationary support for a transverse shaft 8, said bearings having apertured embossment portions 9, for a purpose later on explained. Rearwardly projecting from the upper part of the bearings 7 are relatively-convergent downwardly-inclined arms 10 which merge together at 11 and have apertured side lugs 12, as well as a longitudinally-split cylindrical-section 13, adjustable for clamping purposes by a screw stud 14. In addition, the bracket or frame 5 is provided with a heel 15 affording support below the section 13, and serving as an extra means whereby said bracket or frame can be rigidly secured to the tank compartment shell 3 by welding, for example.

Mounted on the shaft 8, intermediate the bearings 7, are the spaced arms 16 of a hand lever 17, said arms being spanned to one side of the lever 17 by a relatively-angled fork 18, while the free ends of the latter are alignedly-apertured for the reception of pins 19, which afford support for a yoke 20, in turn firmly attached to the upper end of the lift rod 1 by an acorn nut 21 and opposed securing means (not shown).

Fulcrumed on the shaft 8 between the spaced arms 16 is one end of a link 22, the other end whereof is cranked and forked at 23 for reception of the spaced wings 24 of a shackle-like clevis 25, said parts being articulated by a shackle-pin 26 secured in the spaced wings 24, as by cotter pins, not shown, against relative displacement. A split-sleeve 27 and jamb-nut 28, whereto the cable 29 connecting with the remote valve-actuating mechanism, customarily housed within the utility-box at the rear end of the tank vehicle, is provided in connection with the clevis 25 for secure attachment of said cable.

A recoil spring 30 is fitted between a circumferential shoulder 31 of the clevis 25 and the split-section 13, about the cable 29, which normally functions to hold the mechanism in the position of Fig. II, said spring being held under compression in concentric relation to the cable 29 by encircling the clevis 25 at one end, and at the other end by embracing a lock nut 32 on the end of the cable conduit 33, after the latter has been firmly clamped in the split section 13 by the set screw 14.

Medially pivoted by a pin 34 between the spaced arms 16 of the hand lever 17 is a vertically-movable or downwardly-acting latch hook or catch 35 having, to one side of said pin 34, a cut-out or notch 36 in its underside, ordinarily in holdfast engagement over the medial portion of the shackle-pin 26, but adapted for release therefrom by the hand lever 17, as later on explained. The pivotal movement of the latch catch 35 is limited in one direction by a stop or pin 37 intermediate the spaced arms 16 of the hand lever 17, while it is actuated by a hook rod 38, passing through the hand lever 17 and pivotally connected thereto at 39. The upper end of the hook rod 3 is fitted with a cap button 40, between which and a shoulder 41 in the hand lever axial bore 42, is a spring 43 in compression; said spring normally tending to hold the latch hook 35 in engagement with the shackle-pin 26. Now it will be apparent that when axial pressure is exerted on the cap button 40 with downward projection of the hook-rod 38, the latter will rock the latch hook 35 on the pin 34 and release said hook from the shackle pin 26, whereupon the recoil spring 30 will instantly exert its influence, or move the associated parts to the position of Fig. IV. In other words, Fig. IV shows the mechanism after a valve has been locally closed by actuation of the hand lever 17 with the distant control operating mechanism in the utility box still open. It will also be apparent that upon closure of the distant control in the utility box, the spring 30 will concurrently axially expand to the position of Figs. I and II, with resultant re-engagement of the shackle-pin 26 in the latch notch 36, in a manner obvious from the foregoing disclosure, whereupon all the described parts are ready for operation by the cable connected mechanism at the rear of the tank vehicle, or by the hand lever 17 as above set forth.

Referring now to Figs. V and VI, all parts corresponding with those previously explained are designated by the same reference characters with an added prime exponent, in order to avoid unnecessary repetitive description; while it is to be remarked that the characterizing difference of the modified form of the invention relates substantially to the latch hook 45. This latch hook 45 is pivoted on the clevis shackle-pin 26', and not between the spaced arms 16' of the hand lever 17' as previously described, while the notch 46 therein is provided in its upper side for coaction with a stop pin 47 securely fixed between said arms 16. The latch hook 45 is furthermore formed with a flat 48 for engagement with the lower end of the hook rod 38', while it is upwardly influenced by a spring 49 in compression engaged between a projection 50 on the underside of said latch hook and an opposing projection 51 on the hub of the crank-ended link 22'. Thus it will be readily seen the latch hook 45 is upwardly-influenced for normal retention of its notch 46 in engagement with the shackle-pin 26', but that by exerting pressure on the cap button 40', it can be released from said pin, with attendant local closure of the valve actuated by the lift-rod 1.

52 is a closure for the mechanism which is conveniently secured in place by appropriate fastening means 53 engaging in the apertured embossment portions 9, and side lugs 12, hereinbefore referred to; and said closure has a cut-out 54 affording clearance for operation of the hand lever 17 or 17', in addition to a notch 55 for passage of the cable conduit 33 or 33'.

From the foregoing disclosure, it is thought the merits and advantages of the invention will be clearly appreciated, and, while there has been illustrated and described specific embodiments thereof, it is to be understood that various alterations in the details of construction may be made without departing from the spirit of said invention as indicated by the following claims.

Having thus described the invention, I claim:

1. In valve operating mechanism including local and distant actuators, a coupler comprising a shackle-like clevis device attached to one of the actuators, and a vertically-movable notched-catch for coaction with the clevis device shackle-pin to couple both actuators together for joint operation.

2. In valve operating mechanism including coordinated local and distant actuator mechanisms a coupler comprising a shackle-like clevis attached to one of the actuator mechanisms, and a horizontally-pivoted downwardly-active notched catch carried by the local mechanism and adapted to automatically engage the clevis shackle-pin for effecting joint operation of both mechanisms.

3. In a valve operating mechanism including cable-coordinated local and distant actuator mechanisms, a shackle-like clevis attached to a free end of the cable, a horizontally-pivoted downwardly-active notched catch adapted for automatic coaction with the clevis shackle-pin for coupling together the respective actuator mechanisms, and push means whereby the notched catch may be released when desired, and for subsequent automatic restoration to coupling position.

4. In a valve operating mechanism including independently operable local and distant actuator means, an intervening shackle-like clevis, a vertically-movable notched-catch carried by one of said means, and a rigid component on the other means automatically engageable by said notched-catch to couple both mechanisms together through the medium of the shackle-like clevis to effect their joint operation.

5. In valve operating mechanism including coordinated local and distant actuator mechanisms, the combination of a coupler comprising a shackle-like clevis attached to one of the actuator mechanisms, and a catch carried by the other actuator mechanism for operative coaction with the shackle pin of said clevis.

6. In valve operating mechanism including cable coordinated local and distant actuator mechanisms, the combination of a coupler comprising a shackle-like clevis attached to one end of the cable, a catch means carried by the other actuator mechanism for operative coaction with the shackle pin of said clevis, and means whereby the catch means may be released from the clevis when desired and automatically re-engaged therewith upon subsequent operation of its cable connected mechanism.

7. In valve operating mechanism including a local lift-mechanism and a distant cable-connected actuator mechanism, the combination of a coupler for operatively coordinating such mechanisms, said coupler comprising a shackle-like clevis attached to the cable end adjoining the lift-mechanism, a hook-catch carried by said last mentioned mechanism engageable with the shackle-pin of the clevis, and means whereby the hook-catch may be released from said shackle-pin when it is desired to operate the valve locally.

8. In valve operating mechanism including a local pull-up actuator mechanism and a distant cable-connected actuator mechanism, the combination of a coupler for operatively coordinating such actuator mechanisms, said coupler comprising a spring-influenced shackle-like clevis attached to the cable end adjoining the pull-up mechanism, a catch pivoted to said pull-up mechanism and having a notch engageable with the clevis shackle-pin, and spring influenced means whereby the catch may be released from said shackle-pin when the valve is locally operated.

9. In valve operating mechanism including a local pull-up actuator means and a distance cable-connected actuator means, the combination of a coupler for operatively coordinating such actuator means, said coupler comprising a spring-influenced shackle-like clevis attached to the cable end adjoining the pull-up actuator means, a catch pivoted to said pull-up actuator means and having a notch engageable with the clevis shackle-pin, spring-influenced means whereby the catch may be released from said shackle when the valve is locally operated, and said shackle-pin automatically returning into engagement with the catch when the remote cable-connected actuator means is moved into closed position.

10. In valve control mechanism of the type described including a local hand-lever operated pull-up actuator and a cable-connected distant lever-actuated mechanism, the combination of a coupler-connection comprising a shackle-like clevis attached to the cable end adjacent the pull-up actuator, a recoil-spring interposed between said clevis and a stationary abutment, a link coordinating the clevis shackle-pin with the fulcrum axis of the local hand-lever, a catch pivoted to said hand-lever and having a notch in its underside engageable with the clevis shackle-pin, means limiting oscillation of the pivoted catch in one direction, and a spring-influenced push rod coordinated with the catch and housed in an axial bore of the local hand-lever whereby said catch may be released from the shackle-pin for local closure of the valve.

11. The combination of claim 10 wherein the means limiting oscillation of the pivoted catch consists of a pin intermediate spaced arms of the hand-lever, and the recoil-spring operates to automatically re-engage the clevis shackle-pin with the catch notch when the cable-connected remote lever-actuated mechanism is moved to closed position.

12. In valve control mechanism including a hand lever-operated local pull-up actuator and a cable-connected distant lever-actuated mechanism, the combination of a coupler-connection comprising a shackle-like clevis attached to the cable end adjacent the local actuator, a recoil-spring interposed between the clevis and a stationary abutment, a crank-ended link coordinating the clevis shackle-pin with the fulcrum axis of the local hand-lever, an upwardly-influenced catch pivoted on the clevis shackle-pin and having a notch in its upper edge for coaction with a stop intermediate spaced arms of the local hand-lever, and spring-influenced push means axially housed in said hand-lever whereby the catch may be released from the stop to effect local closure of the valve.

13. The combination of claim 12 wherein the catch upwardly-influencing means comprises a spring in compression engaging a projection on the underside of said catch, and an aligned projection on the hub of the crank-ended lever coordinating the clevis with the fulcrum axis of the local hand-lever.

14. In a multiple-compartment tank having an individual drain valve for each compartment the combination of control means, whereby said valve may be actuated locally or from a distant point, comprising a flexible connector coordinating the local and distant actuator means, a shackle-like clevis device secured to the flexible connector end adjoining the local actuator means, and a coupler device carried by said local means for coaction with the clevis device and operation of the valve by the distant actuator means.

15. In a multiple-compartment tank vehicle having an individual drain valve for each compartment the combination of control means, whereby said valve may be actuated locally or from a distant point, comprising a cable coordinating the local and distant actuator means, a clevis device having a shackle-pin secured to the cable end adjoining the local actuator means, and a notched latch carried by the local actuator means and engageable with the clevis shackle-pin for operation of the valve by the distant actuator means.

16. In a multiple compartment tank having an individual drain valve for each compartment the combination of control means whereby said valve may be actuated locally or from a distant point, comprising local operating means whereby the valve can be released for automatic closure as the tank compartment is filled to the requisite level; cable-connected distant operating means whereby the valve can be opened or released for automatic closure; a spring-influenced clevis device including a shackle-pin, secured to the cable end adjoining the local operating means; and a pivoted-latch, with associated trip means, carried by the local operating means and having a notch engageable with the shackle-pin for lifting the discharge valve by the distant operating means, but releasable from said pin to effect automatic closure of the valve by the local operating means.

17. In a multiple compartment tank vehicle having an individual drain valve for each compartment the combination of control means, whereby said valve may be actuated locally or from a distant point, comprising local operating means by which the valve can be released for automatic closure as the tank compartment is filled to the requisite level, or opened as desired; cable-connected distant operating means whereby the valve can be opened or released for automatic closure; a spring-influenced clevis device, including a shackle-pin, secured to the cable end adjoining the local operating means; a pivoted-latch carried by the local operating means and having a notch normally engaged with the shackle-pin during opening and closing of the valve by the distant operating means, trip means whereby said latch is disengageable from the shackle-pin to affect local closure or opening of the valve, and means whereby said latch is caused to reengage the shackle-pin when the distant operating means is returned to valve operating position.

18. The combination of claim 17 wherein the latch is spring-influenced, means being provided to limit movement of said latch when released from the clevis-device shackle-pin, and said clevis-device is under the action of a spring always under compression.

JAMES A. JENSEN.